US010176232B2

(12) United States Patent
Coll et al.

(10) Patent No.: US 10,176,232 B2
(45) Date of Patent: Jan. 8, 2019

(54) BLENDING ENTERPRISE CONTENT AND WEB RESULTS

(71) Applicant: MICROSOFT TECHNOLOGY LICENSING, LLC, Redmond, WA (US)

(72) Inventors: Alexander O. Coll, Seattle, WA (US); Richard J. Qian, Redmond, WA (US); Daniel Marantz, Bellevue, WA (US); Yan Ke, Redmond, WA (US); Yi Li, Issaquah, WA (US); Javier Garcia Flynn, Perth (AU); Longfei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 15/057,972

(22) Filed: Mar. 1, 2016

(65) Prior Publication Data

US 2017/0255627 A1    Sep. 7, 2017

(51) Int. Cl.
G06F 17/30    (2006.01)

(52) U.S. Cl.
CPC .... G06F 17/3053 (2013.01); G06F 17/30528 (2013.01); G06F 17/30554 (2013.01); G06F 17/30867 (2013.01)

(58) Field of Classification Search
CPC ........... G06F 17/3053; G06F 17/30528; G06F 17/30554; G06F 17/30867
See application file for complete search history.

(56) References Cited

U.S. PATENT DOCUMENTS 6,601,061 B1 *  7/2003  Holt ................. G06F 17/30864
8,341,651 B2    12/2012  Kapadia et al.
(Continued)

FOREIGN PATENT DOCUMENTS

CN        102200975 A    9/2011
KR        20140109681 A  9/2014

OTHER PUBLICATIONS

Vaidyanathan, Aruna, "Designing an Effective Enterprise Search Solution", In Insights Whitepapers, Cognizant 20-20 Insights, Feb. 2012, 8 pages.
(Continued)

*Primary Examiner* — Jay A Morrison
(74) *Attorney, Agent, or Firm* — Shook, Hardy and Bacon, L.L.P.

(57) ABSTRACT

Web search results and enterprise search results are combined into a single presentation. A search query is received from a user associated with a tenant of an enterprise cloud computing platform. Web search results are retrieved based on the search query. The Web search results are ranked and sent to the search engine user interface. An intent of the search query is determined. It is determined that the search query is related to the tenant's enterprise data. An instruction containing the search query keywords and intent is sent to the search engine user interface, and is configured to cause the search engine user interface to submit the keywords intent to an enterprise search engine within the enterprise cloud computing platform. A content template is communicated to the search engine user interface. The content template is configured to display enterprise search results received at the search engine user interface.

15 Claims, 5 Drawing Sheets

(56) References Cited

U.S. PATENT DOCUMENTS

| | | | |
|---|---|---|---|
| 8,738,596 B1 | 5/2014 | Kim et al. | |
| 8,832,056 B2 | 9/2014 | Smyth et al. | |
| 8,892,592 B2 | 11/2014 | Timm et al. | |
| 8,938,726 B2 | 1/2015 | Barak | |
| 9,058,362 B2 | 6/2015 | Vijayaraghavan et al. | |
| 2008/0072180 A1 | 3/2008 | Chevalier et al. | |
| 2011/0184936 A1 | 7/2011 | Lymberopoulos et al. | |
| 2011/0213765 A1* | 9/2011 | Cui | G06F 17/30864 707/711 |
| 2012/0136887 A1* | 5/2012 | Cha | G06F 17/3064 707/767 |
| 2013/0110860 A1 | 5/2013 | Taranov et al. | |
| 2013/0179450 A1* | 7/2013 | Chitiveli | G06F 17/30283 707/737 |
| 2013/0325463 A1* | 12/2013 | Greenspan | G06F 3/013 704/235 |
| 2014/0172840 A1 | 7/2014 | Kumar et al. | |
| 2015/0095303 A1 | 4/2015 | Sonmez et al. | |
| 2015/0120700 A1 | 4/2015 | Holm et al. | |
| 2015/0127677 A1 | 5/2015 | Wang et al. | |
| 2015/0199436 A1 | 7/2015 | Bailey et al. | |
| 2015/0242402 A1 | 8/2015 | Holm et al. | |
| 2015/0248222 A1 | 9/2015 | Stickler et al. | |
| 2015/0293976 A1 | 10/2015 | Guo et al. | |
| 2015/0312259 A1* | 10/2015 | Alpha | H04L 63/0428 726/4 |
| 2016/0357756 A1* | 12/2016 | Gelfand | G06F 17/3053 |

OTHER PUBLICATIONS

Synata, "Enterprise Graph Search: A Game Changer in Information Retrieval", published Nov. 24, 2015, http://blog.synata.com/blog/2014/5/8/enterprise-graph-search-a-game-changer-in-information-retrieval, 7 pages.

Schwartz, Jeffrey, "SharePoint 2013 to 'Supercharge' Enterprise Social Networking", In Redmond Magazine, Nov. 13, 2012, https://redmondmag.com/articles/list/news.aspx, 4 pages.

Ferrara, John, "Strategies for Improving Enterprise Search—Beyond the Out-of-the-Box Experience", published Sep. 11, 2007, http://boxesandarrows.com/strategies-for-improving-enterprise-search/; 17 pages.

Stride, "Be more productive with your documents", https://stridelabs.com, 3 pages.

Google Search for Work, "Google Search Appliance 7.4", https://www.google.com/work/search/products/gsa.html; 14 pages.

Keller, et al., "XSearch: A Unified Search and Cross-reference Detection Engine for the ISS Mission Control Center", In Proceedings of the 2011 IEEE Aerospace Conference, Mar. 5, 2011, 12 Pages.

"International Search Report and Written Opinion Issued in PCT Application No. PCT/US2017/019234", dated Apr. 6, 2017, 13 Pages.

* cited by examiner

BLENDING ENTERPRISE CONTENT AND WEB RESULTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Some aspects of the technology described herein relate to search engines, and more particularly integrating searches of public data with searches of private data.

BACKGROUND

Search engines are widely used to search for publicly-available documents on the World Wide Web. A Web search engine typically maintains a database of documents that are fetched from the World Wide Web, and generates an index of the documents based on the contents and/or metadata associated with the documents. When a search query is received from a user, the index enables the Web search engine to quickly identify documents containing keywords specified in the search query. The Web search engine retrieves the identified search results and communicates the search results to the user's browser which presents the search results on a Web page such as the search engine user interface or search results page. The Web search engine also typically maintains a search log which tracks search queries from large numbers of users, as well as which search results were ultimately accessed by the users, among other things. Web search engines are often optimized to meet the needs of the population in general. For example, in response a search query from a user, the search engine may identify and rank search results based on the popularity of search results returned in response to related queries from other users within the general public, as determined from the search log.

An enterprise such as a business or other type of organization may utilize a search engine to search the enterprise's private information that is accessible via the enterprise's internal network. For example, an enterprise may use a private network for communication between computers and related devices within the enterprise. The private network may allow users, such as employees of the enterprise, to not only communicate internally with other users in the enterprise, but also to access databases which store enterprise-related data. The users within the enterprise may utilize a search engine to search one or multiple databases storing many different kinds of information. A search engine in such an environment may be a custom search engine, or otherwise tailored for access to the data that is private to the enterprise. If a user within the enterprise wishes to search both the World Wide Web and the enterprise data, separate search queries, and/or separate search engines, may be required.

BRIEF SUMMARY

The technology described herein generally relates to integrating searches of public data with searches of private data such that the private data is not accessed by a public search engine. In an aspect, when a search query is received from a user via a Web search engine user interface, a determination is made that the user is associated with an enterprise that is a tenant of an enterprise cloud computing platform. Web search results are retrieved by a Web search engine based on the search query, are ranked, and communicated for presentation in the search engine user interface in the user's Web browser. A likely intent of the search query is determined. A determination is made that the search query is related to the enterprise data associated with the tenant. An instruction which includes one or more keywords from the search query and the intent of the search query is communicated to the user's Web browser. The instruction is configured to cause the user's Web browser to submit the one or more keywords and the intent of the search query to an enterprise search engine within the enterprise cloud computing platform. A content template configured to display enterprise search results is communicated to the user's Web browser. The instruction and/or the content template may be communicated with the Web search results.

Additional objects, advantages, and novel features of the technology described herein will be set forth in part in the description which follows, and in part will become apparent to those skilled in the art upon and because of examination of the following, or may be learned by practice of the technology described herein.

BRIEF DESCRIPTION OF THE SEVERAL VIEWS OF THE DRAWING

Some aspects of the technology discussed herein are described in detail below with reference to the attached drawing figures, wherein.

DETAILED DESCRIPTION

The technology described herein generally relates to receiving a search query at a Web search engine and combining Web search results and search results from a private source into a single presentation, without allowing the Web search engine to access the private source. For example, when a user within an enterprise submits a query to a Web search engine, the identity of the enterprise may be determined to be an enterprise that utilizes an enterprise cloud computing platform. The search query may be used to search for Web content, which may be selected or ranked based on publicly available information pertaining to the enterprise, such as type of industry, types of Web search results typically accessed by users within the enterprise, and so forth. The Web search results may be sent to the user's Web browser, along with an instruction containing the query (or a modified version of the query) which instructs the Web browser to submit the query to an enterprise search engine within the secure enterprise cloud computing platform. A content template that is configured to present enterprise search results received from the enterprise search engine may also be sent to the user's Web browser. The Web browser automatically submits the query to the enterprise search engine. The enterprise search engine retrieves enterprise-related search results from a secure data store of enterprise content that is hosted within the enterprise cloud computing platform. The enterprise search results may be selected and/or ranked based on information about the enterprise that is maintained within the secure platform. Once the enterprise search results are returned to the Web browser, the Web browser utilizes the content template to present the enterprise search results with the Web search results. Thus, as described above, the user's Web browser receives search results from the Web search engine, but is redirected to retrieve the proprietary search results from a server within the enterprise cloud computing platform. In this way, the user is presented with a combined presentation of Web search results and enterprise search results, but the Web search engine does not access the secure enterprise content. This is in contrast to the normal operation of a search performed on the Internet, in which a user submits a search query to a Web search engine, and the Web search engine generates all of the search results which are communicated to the user's Web browser.

Figure 1:
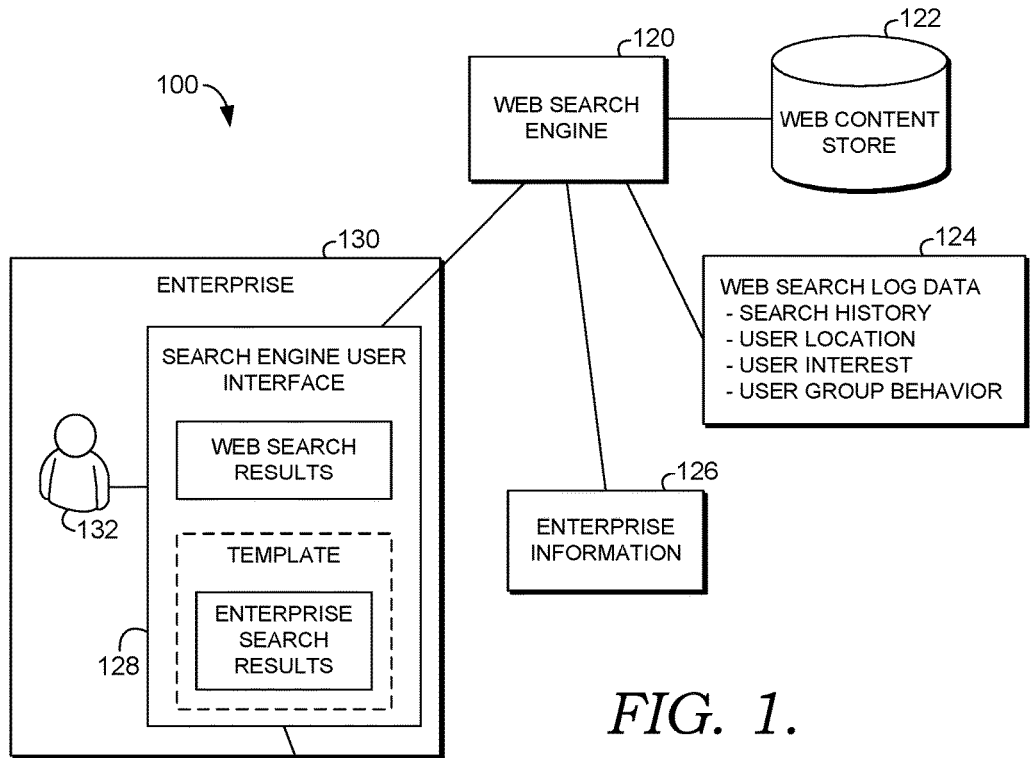
FIG. 1 depicts a system for combining public search results and enterprise search results, according to an aspect of the technology described herein.
Figure 1:
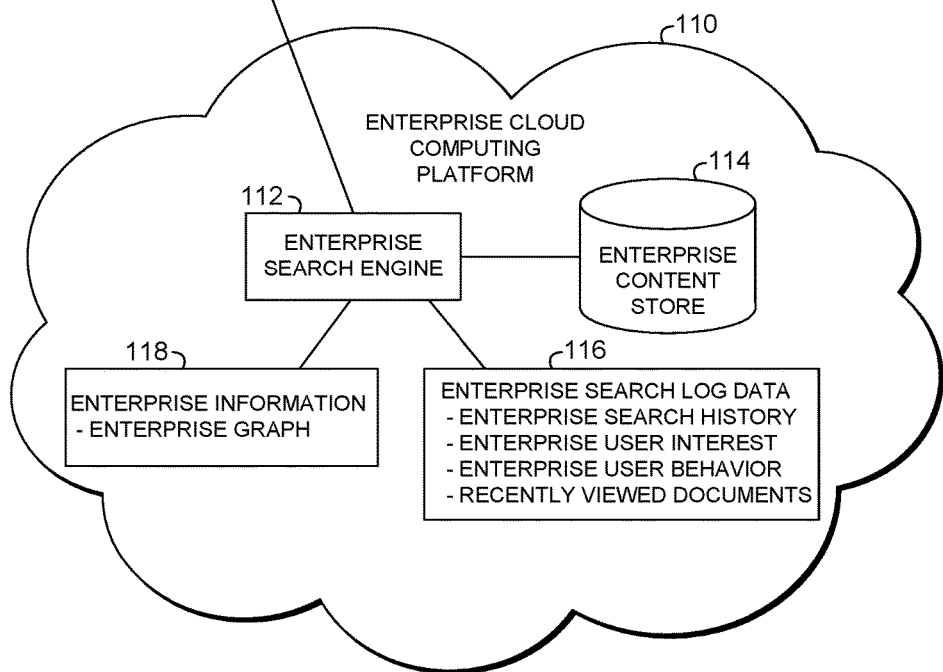

Referring now to FIG. 1, a system for combining public search results and enterprise search results is depicted, and is designated generally as system 100. System 100 is but one example of a suitable system and is not intended to suggest any limitation as to the scope of use or functionality of the technology described herein. Neither should system 100 be interpreted as having any dependency or requirement relating to any one or combination of components illustrated.

As depicted in FIG. 1, system 100 includes an enterprise cloud computing platform 110, which includes an enterprise search engine 112, an enterprise content store 114, enterprise search log data 116, and enterprise information store 118. System 100 further includes a Web search engine 120, a Web content store 122, Web search log data 124, and enterprise information 126. In some aspects, system 100 interacts with a search engine user interface 128 which is hosted within an enterprise 130.

In an aspect, enterprise cloud computing platform 110 provides information technology (IT) resources and applications to end users over a network such as the Internet. A variety of services including application services, databases, and storage, among others, may be provided to end users, e.g., enterprises, such that an enterprise can access and utilize the services without having to host the services, whether hardware or software, within the enterprise. Enterprise cloud computing platform 110 may be implemented within one or more datacenters comprising one or more computing devices such as servers, storage devices, and other types of network devices. Enterprise content store 114 may include one or more hardware storage devices and/or one computing devices, and may be configured as one or more databases or other memory configurations. Enterprise search engine 112 may include one or more computing devices configured to perform search functions, and may perform the search functions with respect to the contents of enterprise content store 114, as well as other functions that facilitate searches and evaluation of search results. In one aspect, enterprise cloud computing platform 110 is a secure environment, i.e., the enterprise content is accessible only to users having proper login credentials, and is not available to the general public, and is not accessible via a public search engine.

For a given enterprise, such as enterprise 130, enterprise content store 114 may include documents, email, proprietary data, and so forth, which belong to, or are associated with, the enterprise, and which are not publicly available. Enterprise information store 118 may include information about an enterprise, including an enterprise graph which describes relationships between individuals within the enterprise. The data stored in enterprise cloud computing platform 110 may be secured, i.e., the enterprise data and content for a particular enterprise may only be accessed by a user having proper credentials associated with that enterprise. A user associated with an enterprise may login to the enterprise cloud computing platform and utilize features such as word processing applications, email, messaging, document storage, spreadsheet applications, and other types of applications and services. Access may be granted on a subscription basis which specifies with services are available to users associated with an enterprise.

Web content store 122 may include one or more hardware storage devices and/or computing devices, and may be configured as one or more databases or other memory configurations. In an aspect, Web content store 122 includes a database of documents that are fetched from the World Wide Web, and which may be indexed to facilitate searching. Web search engine 120 may include one or more computing devices configured to perform search functions, and which may operate to perform the search functions with respect to the contents of Web content store 122, as well as other functions that facilitate searches and evaluation of search results. Web search engine 120 may also maintain Web search log data 124 for tracking, among other things, search histories, user location, user interest, and user group behavior, in accordance with the Web search engine privacy and data collection policies. In an aspect, and in contrast to enterprise content store 114, Web content store 122 is publicly accessible.

In an aspect, Web search engine 120 is configured to receive a search query from a user 132 within enterprise 130, submitted by way of search engine user interface 128 which is presented on a Web browser. Web search results are retrieved from Web content store 122, based on the search query. Web search engine 120 may determine that user 132 is associated with enterprise 130, and that enterprise 130 utilizes enterprise cloud computing platform 110 to store enterprise data associated with enterprise 130. Although in one aspect Web search engine 120 does not have access to the secure data within the enterprise cloud computing platform 110, Web search engine 120 may have access to publicly available information about enterprise 130, and may store information about enterprise 130 in enterprise information 126. Based on determinations that particular users are associated with particular enterprises, Web search engine 120 may track search histories, user locations, user interests, and user group behavior on a per-enterprise basis, such that the information stored in the Web search log data may be accessed and analyzed for each particular enterprise. Web search engine 120 may select, rank, or otherwise filter the Web search results based on specific information about enterprise 130 obtained from enterprise information 126, and/or from Web search log data 124. For example, if a search term "java" is received from a user in an enterprise, and the stored information about the enterprise indicates that it is a coffee shop, then search results pertaining to the coffee-related term "java" may be ranked higher than search results related to the Java programming language. Using information about the enterprise to determine the search results provides the user with a more efficient Web search, because the user is less likely to have to read through unrelated results to find results pertaining to the enterprise's activities. The ranked Web search results are communicated by Web search engine 120 to the user's Web browser for presentation on search engine user interface 128.

In an aspect, responsive to the determination of the association between user 132 and enterprise 130, Web search engine 120 parses or otherwise analyzes the search query to determine whether a likely intent of the query includes accessing enterprise content associated with enterprise 130. Web search engine 120 may utilize information from either or both of enterprise information 126 and Web search log data 124 in determining the likely intent of the search query, and may also use semantic analysis of the search query in making the determination. When a determination is made that the likely intent of the query includes accessing enterprise content associated with enterprise 130, Web search engine 120 communicates to the user's Web browser an instruction that includes one or more keywords from the query and an indication of the intent of the query. The instruction is configured to cause the Web browser to submit the one or more keywords and the indication of the intent of the query to enterprise search engine 112 within the enterprise cloud computing platform. In an aspect, the instruction is an executable script embedded within the displayed page data of the search engine user interface 128. In an aspect, the script, while not visible to user 132, is automatically executed by the Web browser. Execution of the script causes a query, comprising the keywords and the intent, to be submitted to enterprise search engine 112. The instruction may be communicated to the user's Web browser with the Web search results.

Enterprise search engine 112 receives the query comprising the keywords and the intent, and performs a search of the enterprise content associated with enterprise 130 which is stored in enterprise content store 114. Enterprise search engine 112 may utilize information from either or both of enterprise information store 118 and enterprise search log data 116 to select, rank, or otherwise filter the enterprise search results retrieved from enterprise content store 114. In an aspect, enterprise search engine 112 accessed an enterprise graph associated with the enterprise. The enterprise graph may describe relationships between individuals, as well as associations between individuals and documents, within the enterprise. For example, the enterprise graph may identify personnel, job descriptions, titles, hierarchical relationships between personnel, departmental relationships, email addresses, work projects, and so forth. At a step 344, the enterprise search results are ranked or otherwise filtered based on information from the enterprise graph. For example, a user's search for "John Smith" might return search results that include documents authored or edited by a coworker named John Smith. In response to a search a particular topic, the enterprise search engine might return an enterprise document related to that topic, but then identify a department associated with the document and then return other documents associated with that department. Knowledge of a user's own job description or work projects stored in the enterprise graph may be used to narrow search results in response to a query submitted by the user.

Enterprise search engine 112 returns the enterprise search results to the user's Web browser, which then presents the enterprise search results with the Web search results in search engine user interface 128. The instruction sent to the Web browser from Web search engine 120 may include formatting, a template, or other types of instructions designating how and where the enterprise content should be presented on the displayed search results page. Alternatively, the formatting, a template, or other types of instructions may be provided to the Web browser separately from the instruction to submit the keywords to enterprise search engine 112. In one aspect, the template is utilized by the user's Web browser to access information from a server in enterprise cloud computing platform 110 and to merge the enterprise search results with the Web search results by generating or modifying a Document Object Module that is used by the Web browser to render the Web page, e.g., the search engine user interface, that is presented to the user. The enterprise content and the enterprise search results remain secure and are neither accessed by, nor presented by, the Web search engine.

Figure 2:
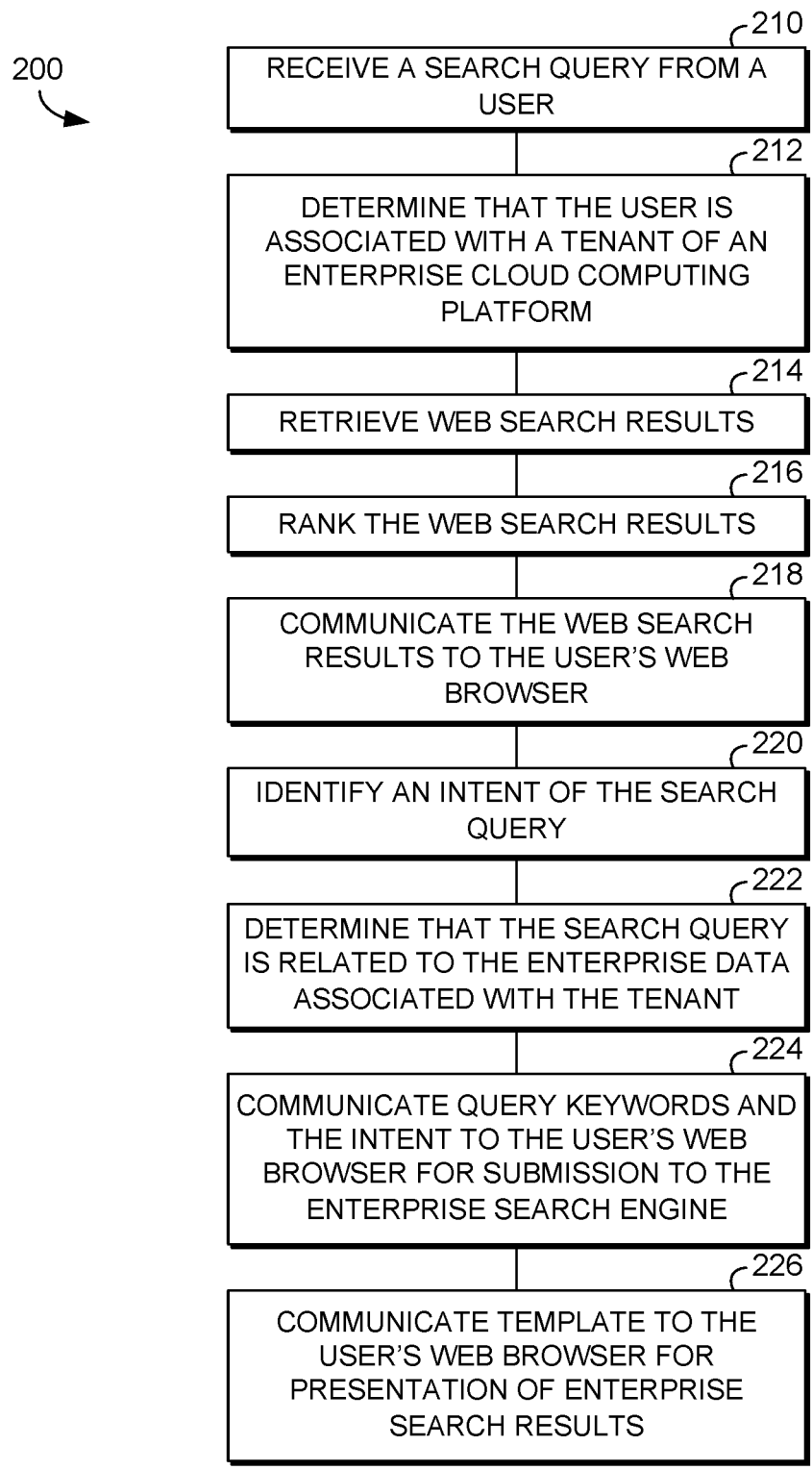
FIG. 2 depicts a method for combining public search results and enterprise search results, according to an aspect of the technology described herein.

Referring now to FIG. 2, a method for combining public search results and enterprise search results is depicted, and is designated generally as method 200. Method 200 is but one example of a suitable method and is not intended to suggest any limitation as to the scope of use or functionality of the technology described herein. Neither should method 200 be interpreted as having any dependency or requirement relating to any one or combination of components illustrated.

At a step 210, a Web search query from a user is received via a search engine user interface that is presented on the user's Web browser. At a step 212, a determination is made that the user is associated with a tenant of an enterprise cloud computing platform which hosts enterprise data associated with the tenant. The tenant may be an enterprise, e.g., a business or other type of organization, which utilizes the enterprise cloud computing platform to store enterprise content, such as documents, emails, business records, and so forth. The enterprise cloud computing platform may also provide various IT services to the tenant. The user's association with the tenant may be as one or more of a member, employee, contractor, and so forth, or any association which provides the user with login credentials that grant access to the enterprise's proprietary enterprise data and IT services within the enterprise cloud computing platform. As such, the user is able to login and utilize the proprietary enterprise data. However, in an aspect, the Web search query that is received at step 210 is not submitted by the user to the enterprise cloud computing platform, but is submitted by the user to a Web search engine via a Web search engine interface, such as a search engine home page displayed in a Web browser.

At a step 214, Web search results are retrieved based on the search query. In an aspect, the Web search results are also based on one or both of the type of enterprise associated with the user and an intent of the user query. Having identified the enterprise based on the user's login credentials, the Web search engine may access publicly available information about the enterprise to determine the type of enterprise, a type of industry associated with the enterprise, products and/or services provided by the enterprise, and so forth. This specific information about the enterprise may be obtained from public sources and/or from the enterprise, and may be stored and/or maintained by the Web search engine. In an aspect, the specific information about the enterprise is utilized to select or otherwise filter the Web search results. In this way, the user is automatically provided with Web search results that are more relevant to the user and the enterprise than if the same search were submitted to a conventional Web search engine, without the user having to specify additional search terms to narrow the search to enterprise-related results.

At a step 216, the Web search results are ranked. In an aspect, the ranking is based at least in part on the information specific to the enterprise described above. Additionally, the Web search engine may keep a search log which tracks search queries specifically from users within the enterprise, as well as which documents or other search results were ultimately accessed by the users within the enterprise. In an aspect, the Web search engine ranks the Web search results based on the popularity of documents or other search results with respect to users within the enterprise. By utilizing the information specific to the enterprise when ranking the Web search results, search results that are more likely to be relevant to the user and the enterprise may be promoted above search results that are less relevant. At a step 218, the ranked Web search results are communicated to the user by way of the Web search engine user interface.

At a step 220, a statistical likelihood representing the user's intent of the search query is determined. The likelihood or probability that the user's intent is related to enterprise data may be calculated at least in part based on a comparison of the search query with data from a log of Web-intent search queries submitted by the general public. The intent also may be determined at least in part based on a log of Web search queries submitted by users within the enterprise, or a combination of search queries submitted by the general public and search queries submitted by users within the enterprise. For example, the search log may be analyzed to determine which documents are most often accessed by users subsequent to submitting the same or a similar search query. The content, subject matter, metadata, and so forth of the documents may be used to determine the likely intent of the Web search query. In one aspect, determining the intent comprises determining a statistical likelihood that a particular set of one or more search results is the target of the user's search (in other words, that one or more search results are likely to be clicked on or accessed by the user). In an aspect, the statistical likelihood may be determined based on a historical sample of search queries, from the search log, of user responses to similar searches, i.e., which search results were selected by other users when similar or identical search terms were used. Additionally or alternatively, the Web search engine may parse the search query and/or perform a semantic analysis of the search terms to determine a probable intent of the search query. At a step 222, a determination is made that the search query is related to the tenant, and/or to the tenant's enterprise data in the enterprise cloud computing platform. The determination may be based at least in part on one or more of the determined intent, the information specific to the enterprise described above, Web search logs that are specific to users within the enterprise, and so forth.

At a step 224, based on the determination that the search query is related to the tenant and/or the tenant's enterprise data, the Web search engine communicates an instruction to the user's Web browser, including an altered version of the search query. In an aspect, the instruction is configured to cause the user's Web browser to submit the altered version of the search query to an enterprise search engine within the enterprise cloud computing platform. The instruction communicated to the user's Web browser may be in the form of a script that is executable by the Web browser. The altered version of the search query that is included in or with the instruction may be altered based on the determined intent, the information specific to the enterprise described above, Web search logs that are specific to users within the enterprise, and so forth. The alteration to the search query may include selecting or excluding search terms from the original search query, generating new search terms related to the intent of the search query, and specifying additional parameters to direct the enterprise search engine. In an aspect, the enterprise search engine is configured to accept one or more parameters specifying a category or type of enterprise content that is to be searched. The categories or types of content identified by the parameters may include persons, documents, emails, Web pages, bookmarks, and so forth.

At a step 226, a content template is communicated to the user's Web browser. The content template is configured to display enterprise search results received by the user's Web browser from the enterprise search engine in response to the altered search query. The content template may be implemented with executable scripts, HTML, or other types of directives for configuring the presentation of content on a search results page or Web browser interface. The content template may be communicated to the user's Web browser with the altered search query, and may be configured such that the content template is not visible to the user, and does not take up any area of the display if no search results are returned from the enterprise search engine. In one aspect, the content template is utilized by the user's Web browser to access information from a server in the enterprise cloud computing platform and to merge enterprise search results from the enterprise search engine with the Web search results by generating or modifying a Document Object Module that is used by the Web browser to render the Web page, e.g., the search engine user interface, that is presented to the user.

Figure 3:
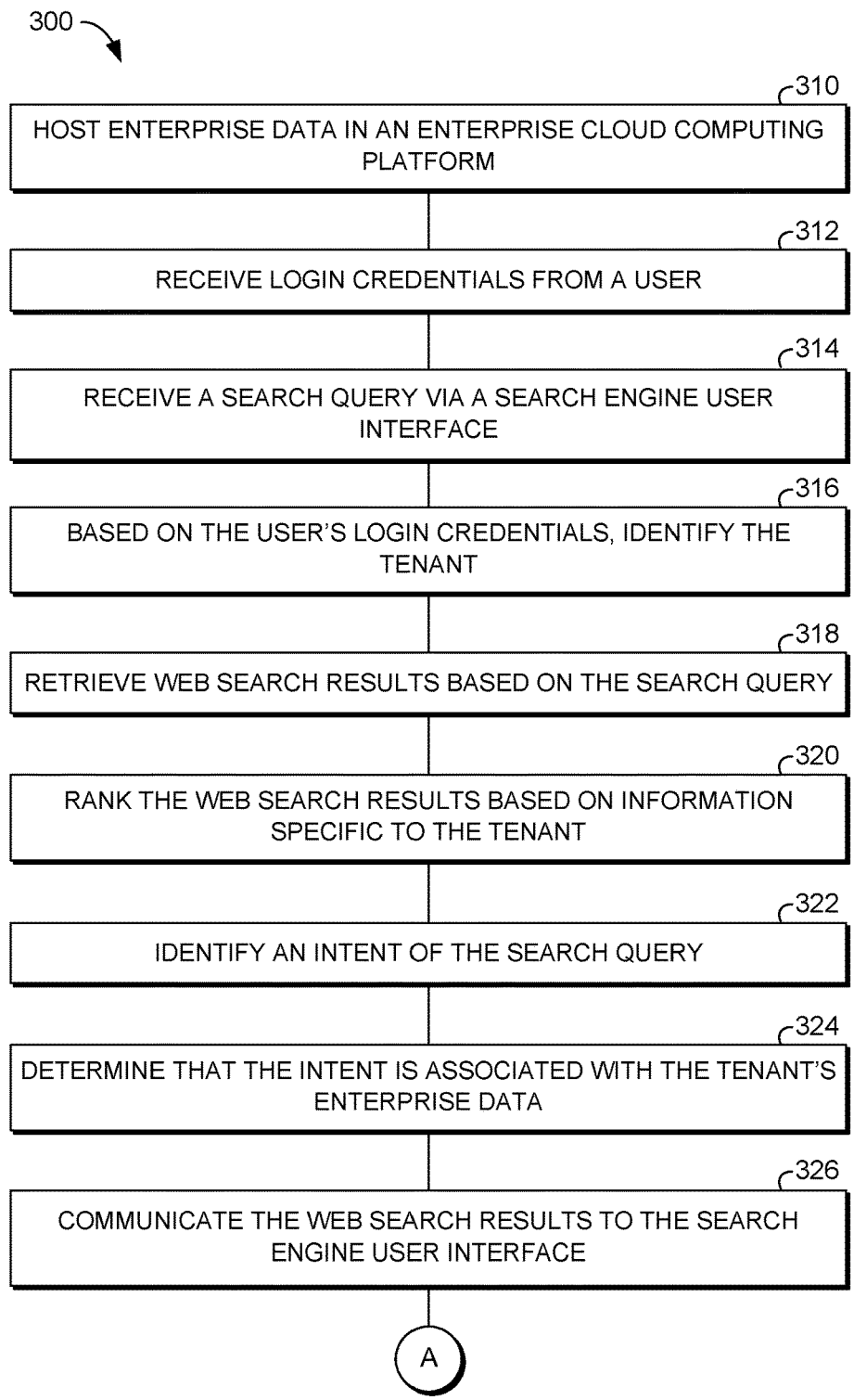
FIG. 3 depicts a method for combining public search results and enterprise search results, according to an aspect of the technology described herein.
Figure 3:
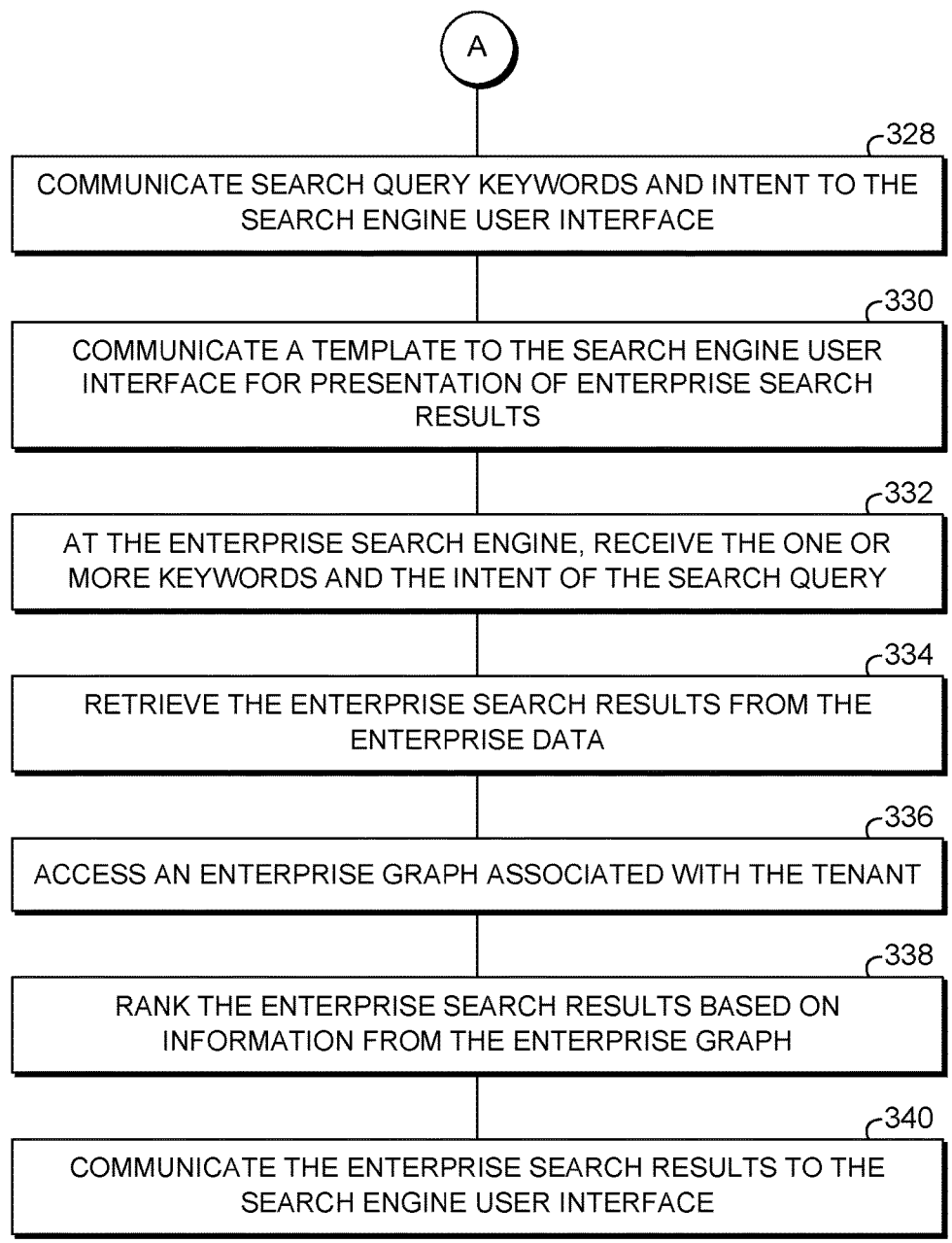

Referring now to FIG. 3, a method for combining public search results and enterprise search results is depicted, and is designated generally as method 300. Method 300 is but one example of a suitable method and is not intended to suggest any limitation as to the scope of use or functionality of the technology described herein. Neither should method 300 be interpreted as having any dependency or requirement relating to any one or combination of components illustrated.

At a step 310, enterprise data is hosted in an enterprise cloud computing platform. Respective portions of the enterprise data correspond to tenants, i.e., enterprises that utilize the enterprise cloud computing platform for IT services and storage of the tenants' enterprise data. The enterprise data may include documents, emails, Web pages, bookmarks, calendars, financial data, sales data, inventory data, personnel data, and so forth, related to the business and/or activities of an enterprise. At a step 312, login credentials are received from a user. The login credentials may be associated with a tenant that utilizes the enterprise cloud computing platform, and enable the user to access the IT services and enterprise data associated with the tenant. The user's association with the tenant may be as one or more of a member, employee, contractor, administrator, and so forth, or any association which provides the user with login credentials that grant access to the enterprise's proprietary enterprise data and IT services within the enterprise cloud computing platform. As such, the user is able to login and access the proprietary enterprise data which is not publicly available. The login credentials do not necessarily grant the user with access to all of the data or services associated with the tenant. Some login credentials may grant access only to particular portions of the tenant's enterprise data and/or services.

At a step 314, a search query is received from the user by way of a search engine user interface. In one aspect, the search engine user interface is a Web search interface that is presented on the user's Web browser. In some aspects, the search engine user interface takes other forms, such as one or more of a search entry field presented by an operating system or other client application on a user device, an intelligent agent or electronic personal assistant which interacts with the user, an address bar in a browser, a dedicated client search application, and so forth. At a step 316, the tenant associated with the user is identified based on the user's login credentials. At a step 318, Web search results comprising publicly available documents are retrieved based on the search query. At a step 320, the Web search results are ranked based on information associated with the tenant that was identified from the login credentials. The Web search engine may have access to publicly available information about the tenant, and may also track search histories, user locations, user interests, and user group behavior on a per-tenant basis. Such information pertaining to a particular tenant may be utilized to select, rank, or otherwise filter the Web search results for a search query from a user associated with the tenant.

At a step 322, a likely intent of the search query is determined. The likely intent may be determined at least in part based on one or more of information about the tenant, a log of Web search queries submitted by the general public, a log of Web search queries submitted by users associated with the tenant, a semantic analysis of the search query, and so forth. At a step 324, a determination is made as to whether the intent of the query is directed to enterprise data that corresponds to the tenant. The intent of the query may be specifically directed at the enterprise data, may be only partially directed at the enterprise data, may be incidentally directed at the enterprise data (as in the case of a more general Web query which happens to overlap with some enterprise-related data), or may be directed only toward content on the Web. In an aspect, when the intent of the search query is specifically, partially, or incidentally directed to the portion of the enterprise data that corresponds to the tenant, the intent of the query is determined to be directed toward the tenant's enterprise data. At a step 326, the Web search results are communicated to the search engine user interface for presentation to the user.

At a step 328, based on a determination that the likely intent of the query is directed toward the tenant's enterprise data, an instruction is sent to the search engine user interface, including one or more keywords from the search query and an indication of the intent of the search query. In an aspect, the instruction is configured to cause the search engine user interface to submit the one or more keywords and the indication of the intent of the search query to an enterprise search engine within the enterprise cloud computing platform. In this way, the Web search engine itself does not access the secure enterprise content in the enterprise cloud computing platform. The instruction may be an executable script embedded within the displayed page data of the search engine user interface, or other form of instruction configured to submit the one or more keywords and the indication of the intent of the search query to the enterprise search engine.

At a step 330, a content template is communicated to the search engine user interface. The content template is configured to display enterprise search results received at the search engine user interface from the enterprise search engine, and may be implemented with executable scripts, HTML, or other types of directives for configuring the presentation of content on a search results page. The content template may be communicated to the search engine user interface with the altered search query, prior to sending the altered query, or after sending the altered query, and may be configured such that the content template is not visible to the user, and does not take up any area of the display if no search results are returned from the enterprise search engine. The content template may be communicated with the instruction to the search engine user interface, and/or embedded within the displayed page data of the search engine user interface. In one aspect, the instruction communicated to the search engine user interface is included in, or is a portion of, the content template. The content template and/or the instruction may be communicated to the search engine user interface with the Web search results.

In one aspect, the content template is utilized by the search engine user interface to access information from a server in the enterprise cloud computing platform and to merge the enterprise search results with the Web search results by generating or modifying a document object module that is used by the search engine user interface to render the page, e.g., the search engine user interface or search results page, that is presented to the user.

At a step 332, the one or more keywords and the intent of the search query communicated from the search engine user interface are received at the enterprise search engine. Because the user is logged in with login credentials associated with the tenant, the enterprise search engine is able to determine which portion of the enterprise data, i.e., the portion associated with the particular tenant, to search. At a step 334, the enterprise search engine retrieves enterprise search results, based on the one or more keywords and/or the intent of the query, from the portion of the enterprise data that corresponds to the tenant. In an aspect, the enterprise search engine utilizes the intent of the query to select or otherwise filter the enterprise search results. The intent of the search query may be characterized by one or more categories, and the enterprise search engine may be configured to search specifically within the particular categories specified by the query intent.

At a step 336, the enterprise search engine accesses an enterprise graph associated with the tenant. In an aspect, the enterprise graph describes relationships between individuals, as well as associations between individuals and documents, within the tenant and the tenant's enterprise data. For example, the enterprise graph may indicate which employees of a business are in the same department, their job descriptions, their titles, their hierarchical positions within the business, their geographic locations, their email addresses, projects they are working on, and so forth. At a step 338, the enterprise search results are ranked or otherwise filtered based on information from the enterprise graph. For example, if the user searches for "Martha," and the enterprise graph shows a "Martha Smith" and a "Martha Brown" in the enterprise, the enterprise search engine may determine that Martha Brown is in the same department as the user and assign a higher ranking to documents or other content associated with Martha Brown, whereas documents associated with Martha Smith might be given a lower ranking.

Additionally, or alternatively, the enterprise search engine may rank or otherwise select or filter the search results based on other information associated with the tenant. In an aspect, the enterprise search engine maintains a search log which tracks enterprise content search queries from users within a given enterprise, as well as which documents or other search results were ultimately accessed by the users within that enterprise. In an aspect, the enterprise search engine ranks the enterprise search results based on the popularity of documents or other search results with respect to users within the enterprise.

At a step 340, the enterprise search engine communicates the enterprise search results to the search engine user interface. As described above, the content template that was sent to the search engine user interface by the Web search engine is configured to display the enterprise search results in conjunction with the Web search results. When the enterprise search results are received by the search engine user interface, the search engine user interface presents the enterprise search results with the Web search results according to the template.

Figure 4:
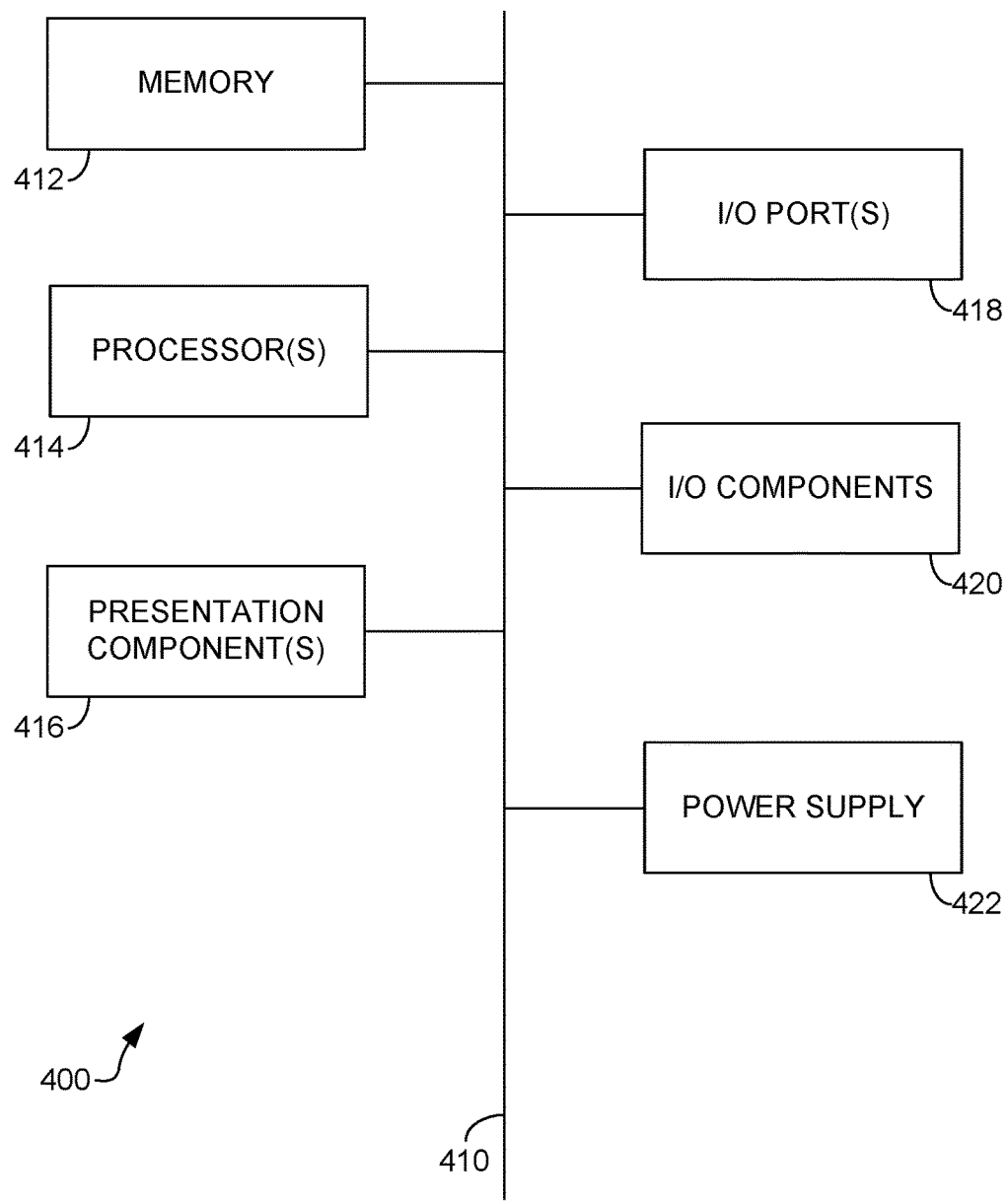
FIG. 4 depicts an exemplary operating environment, according to an aspect of the technology described herein.

Referring now to FIG. 4, an exemplary operating environment for implementing some aspects is shown and designated generally as computing device 400. Computing device 400 is but one example of a suitable computing environment and is not intended to suggest any limitation as to the scope of use or functionality of the technology described herein. Neither should computing device 400 be interpreted as having any dependency or requirement relating to any one or combination of components illustrated.

Some aspects of the technology discussed herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Some aspects of the technology described herein may be practiced in a variety of system configurations, including hand-held devices, consumer electronics, general-purpose computers, more specialty computing devices, etc. Some aspects of the technology described herein may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output ports 418, input/output components 420, and an illustrative power supply 422. Bus 410 represents what may be one or more buses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 4 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 4 and reference to "computing device."

Computing device 400 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or other medium that can be used to encode desired information and be accessed by computing device 400. As used herein, computer-readable media do not include signals per se.

Memory 412 includes computer-storage media in the form of volatile and/or nonvolatile memory. The memory may be removable, nonremovable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc.

Based upon and because of having read the foregoing, it will be seen that aspects of the technology described herein are well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made of the technology described herein without departing from the scope thereof, it is to be understood that all matter herein set forth or shown in the accompanying drawings is to be interpreted as illustrative and not in a limiting sense.

Embodiments

Embodiment 1. A computing system comprising: a processor; and computer storage memory having computer-executable instructions stored thereon which, when executed by the processor, configure the computing system to: receive a search query from a user by way of a Web search user interface presented in a Web browser, determine that the user is associated with an enterprise, determine an intent of the search query, retrieve, based on the search query, Web search results from a Web content data store that stores Web content accessible to a Web search engine, communicate the Web search results to the Web browser, and in response to a determination that the search query is directed at least in part toward enterprise content, communicate a browser-executable instruction to the Web browser, wherein the browser-executable instruction includes one or more keywords from the search query and the intent of the search query, and wherein the browser-executable instruction is configured to cause the Web browser to submit the one or more keywords and the intent of the search query to an enterprise search engine within an enterprise cloud computing platform.

Embodiment 2. The system of embodiment 1, further configured to rank the Web search results based on specific information about the enterprise.

Embodiment 3. The system of embodiment 2, further configured to rank the Web search results based on information retrieved from a Web search log.

Embodiment 4. The system of any one of embodiments 1, 2, or 3, wherein the enterprise search engine is configured to obtain enterprise search results by utilizing the one or more keywords and the intent of the search query to search an enterprise content store which contains proprietary enterprise data including one or more of documents, emails, financial records, proprietary data.

Embodiment 5. The system of embodiment 4, wherein the enterprise search engine is further configured to: access an enterprise graph associated with the enterprise, wherein the enterprise graph describes relationships between individuals and/or associations between individuals and documents, within the enterprise; rank the enterprise search results based on information in the enterprise graph.

Embodiment 6. The system of any one of embodiments 1, 2, 3, or 4 wherein the enterprise search engine is configured to rank enterprise search results based on specific information about the enterprise and/or information retrieved from an enterprise search log.

Embodiment 7. The system of embodiment 4, wherein the enterprise content store and the enterprise search engine are included in a secure enterprise cloud computing platform.

Embodiment 8. The system of any one of embodiments 3, 4, 5, 6, or 7, wherein the determination that the search query is directed at least in part toward enterprise content is based at least on the specific information about the enterprise, the Web search log, and/or a semantic analysis of the search query.

Embodiment 9. A method of generating a combined presentation of Web search results and enterprise search results, comprising: receiving, via a search engine user interface presented on a Web browser, a search query from a user; determining that the user is associated with a tenant of an enterprise cloud computing platform, wherein the enterprise cloud computing platform hosts enterprise data associated with the tenant; based on the search query, retrieving Web search results; ranking the Web search results; communicating the Web search results to the Web browser; determining an intent of the search query; determining that the search query is related to the enterprise data associated with the tenant; communicating an instruction to the Web browser, wherein the instruction includes one or more keywords from the search query and the intent of the search query, and wherein the instruction is configured to cause the Web browser to submit the one or more keywords and the intent of the search query to an enterprise search engine within the enterprise cloud computing platform; communicating a content template to the Web browser, wherein the content template is configured to display enterprise search results received at the Web browser.

Embodiment 10. The method of embodiment 9, further comprising: at the enterprise search engine, receiving the one or more keywords and the intent of the search query from the Web browser; retrieving the enterprise search results from the enterprise data associated with the tenant based on the one or more keywords and the intent of the search query; ranking the enterprise search results; and communicating the enterprise search results to the Web browser.

Embodiment 11. The method of embodiment 10, further comprising: at the search engine user interface presented in the Web browser, displaying the enterprise search results with the Web search results, wherein the enterprise search results are presented according to the content template configuration.

Embodiment 12. The method of any one of embodiments 10 or 11, wherein ranking the enterprise search results comprises: accessing an enterprise graph associated with the tenant; and ranking the enterprise search results based at least in part on information from the enterprise graph.

Embodiment 13. The method of any one of embodiments 9, 10, 11, or 12, wherein retrieving the Web search results includes retrieving the Web results based at least in part on the type of enterprise associated with the user.

Embodiment 14. The method of any one of embodiments 9 or 10, wherein ranking the Web search results comprises: accessing information specific to the tenant; and ranking the Web search results based at least in part on the information specific to the tenant.

Embodiment 15. The method of any one of embodiments 9, 10, or 11, wherein the intent of the search query is determined based at least in part on one or more of information about the tenant, a log of Web search queries submitted by the general public, a log of Web search queries submitted by users associated with the tenant, and/or a semantic analysis of the search query.

What is claimed is:

1. One or more computer-readable media having embodied thereon computer-usable instructions which, when executed by one or more computing devices, perform a method of generating a combined presentation of Web search results and enterprise search results, the method comprising:

hosting enterprise data in an enterprise cloud computing platform, wherein respective portions of secure enterprise data correspond to tenants that utilize the enterprise cloud computing platform;

receiving login credentials from a user by way of a user device, wherein the login credentials are associated with a tenant that utilizes the enterprise cloud computing platform;

receiving, via a search engine user interface on the user device, a first search query from the user;

based on the user's login credentials, identifying the tenant;

retrieving, by way of a Web-based search engine, Web search results based on the first search query;

ranking the Web search results based on information specific to the tenant;

determining an intent of the first search query;

determining that the intent of the first search query is associated with the portion of the enterprise data that corresponds to the tenant;

communicating the Web search results to the search engine user interface for presentation to the user;

communicating an instruction to the search engine user interface on the user device, wherein the instruction includes one or more keywords from the first search query and the intent of the first search query, and wherein the instruction is configured to cause the search engine user interface on the user device to submit a second query, comprising the one or more keywords and the intent of the first search query, to an enterprise search engine within the enterprise cloud computing platform;

at the enterprise search engine, receiving the one or more keywords and the intent of the first search query from the search engine user interface;

retrieving the enterprise search results from the portion of the enterprise data that corresponds to the tenant, based on the second search query comprising the one or more keywords and the intent of the query;

accessing an enterprise graph associated with the tenant;

ranking the enterprise search results based on information from the enterprise graph; and communicating the enterprise search results to the search engine user interface for presentation to the user.

2. The media of claim 1, wherein the information specific to the tenant includes one or more of publicly available information about the tenant, Web search histories for users associated with the tenant, user interests of users associated with the tenant, and/or user group behavior on a per-tenant basis.

3. The media of claim 1, wherein the intent of the search query is determined based at least in part on one or more of information about the tenant, a log of Web search queries submitted by the general public, a log of Web search queries submitted by users associated with the tenant, and/or a semantic analysis of the search query.

4. The media of claim 1, wherein the enterprise search engine utilizes the intent of the search query to select and/or filter the enterprise search results.

5. The media of claim 1, wherein utilizing the intent of the search query to select and/or filter the enterprise search results includes searching for content specifically within one or more categories specified by the search query intent.

6. A method of generating a combined presentation of Web search results and enterprise search results, comprising:
hosting enterprise data in an enterprise cloud computing platform, wherein respective portions of secure enterprise data correspond to tenants that utilize the enterprise cloud computing platform;
receiving login credentials from a user by way of a user device, wherein the login credentials are associated with a tenant that utilizes the enterprise cloud computing platform;
receiving, via a search engine user interface on the user device, a first search query from the user;
based on the user's login credentials, identifying the tenant;
retrieving, by way of a Web-based search engine, Web search results based on the first search query;
ranking the Web search results based on information specific to the tenant;
determining an intent of the first search query;
determining that the intent of the first search query is associated with the portion of the enterprise data that corresponds to the tenant;
communicating the Web search results to the search engine user interface for presentation to the user;
communicating an instruction to the search engine user interface on the user device, wherein the instruction includes one or more keywords from the first search query and the intent of the first search query, and wherein the instruction is configured to cause the search engine user interface on the user device to submit a second query, comprising the one or more keywords and the intent of the first search query, to an enterprise search engine within the enterprise cloud computing platform;
at the enterprise search engine, receiving the one or more keywords and the intent of the first search query from the search engine user interface;
retrieving the enterprise search results from the portion of the enterprise data that corresponds to the tenant, based on the second search query comprising the one or more keywords and the intent of the query;
accessing an enterprise graph associated with the tenant;
ranking the enterprise search results based on information from the enterprise graph; and
communicating the enterprise search results to the search engine user interface for presentation to the user.

7. The method of claim 6, wherein the information specific to the tenant includes one or more of publicly available information about the tenant, Web search histories for users associated with the tenant, user interests of users associated with the tenant, and/or user group behavior on a per-tenant basis.

8. The method of claim 6, wherein the intent of the search query is determined based at least in part on one or more of information about the tenant, a log of Web search queries submitted by the general public, a log of Web search queries submitted by users associated with the tenant, and/or a semantic analysis of the search query.

9. The method of claim 6, wherein the enterprise search engine utilizes the intent of the search query to select and/or filter the enterprise search results.

10. The method of claim 6, wherein utilizing the intent of the search query to select and/or filter the enterprise search results includes searching for content specifically within one or more categories specified by the search query intent.

11. A system for generating a combined presentation of Web search results and enterprise search results, comprising:
one or more processors;
one or more computer-readable media having embodied thereon computer-usable instructions which, when executed by the one or processors, cause the one or more processors to perform operations comprising:
host enterprise data in an enterprise cloud computing platform, wherein respective portions of secure enterprise data correspond to tenants that utilize the enterprise cloud computing platform;
receive login credentials from a user by way of a user device, wherein the login credentials are associated with a tenant that utilizes the enterprise cloud computing platform;
receive, via a search engine user interface on the user device, a first search query from the user;
based on the user's login credentials, identify the tenant;
retrieve, by way of a Web-based search engine, Web search results based on the first search query;
rank the Web search results based on information specific to the tenant;
determine an intent of the first search query;
determine that the intent of the first search query is associated with the portion of the enterprise data that corresponds to the tenant;
communicate the Web search results to the search engine user interface for presentation to the user;
communicate an instruction to the search engine user interface on the user device, wherein the instruction includes one or more keywords from the first search query and the intent of the first search query, and wherein the instruction is configured to cause the search engine user interface on the user device to submit a second query, comprising the one or more keywords and the intent of the first search query, to an enterprise search engine within the enterprise cloud computing platform;
at the enterprise search engine, receive the one or more keywords and the intent of the first search query from the search engine user interface;
retrieve the enterprise search results from the portion of the enterprise data that corresponds to the tenant, based on the second search query comprising the one or more keywords and the intent of the query;
access an enterprise graph associated with the tenant;
rank the enterprise search results based on information from the enterprise graph; and
communicate the enterprise search results to the search engine user interface for presentation to the user.

12. The system of claim 11, wherein the information specific to the tenant includes one or more of publicly available information about the tenant, Web search histories for users associated with the tenant, user interests of users associated with the tenant, and/or user group behavior on a per-tenant basis.

13. The system of claim 11, wherein the intent of the search query is determined based at least in part on one or more of information about the tenant, a log of Web search queries submitted by the general public, a log of Web search queries submitted by users associated with the tenant, and/or a semantic analysis of the search query.

14. The system of claim 11, wherein the enterprise search engine utilizes the intent of the search query to select and/or filter the enterprise search results.

15. The system of claim 11, wherein utilize the intent of the search query to select and/or filter the enterprise search results includes search for content specifically within one or more categories specified by the search query intent.

* * * * *